June 3, 1969
C. E. HEIN
3,447,342
TORQUE LIMITER DEVICE
Filed Oct. 30, 1967
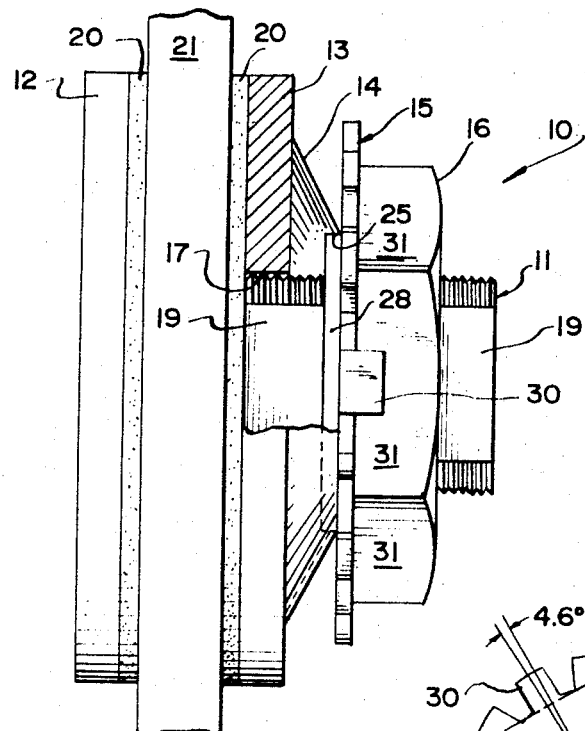
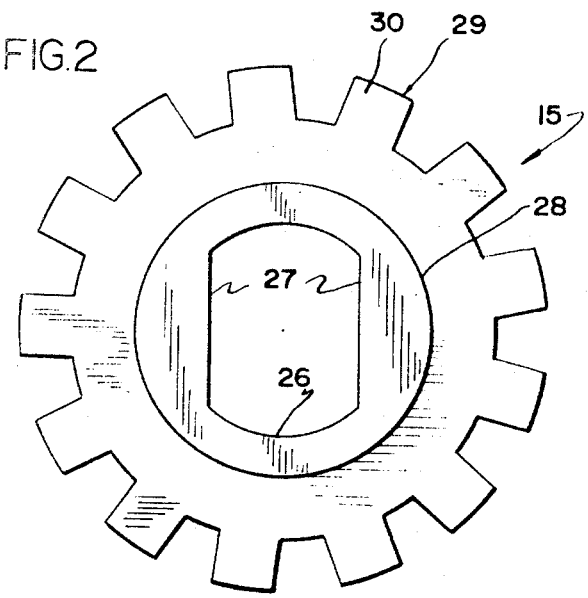
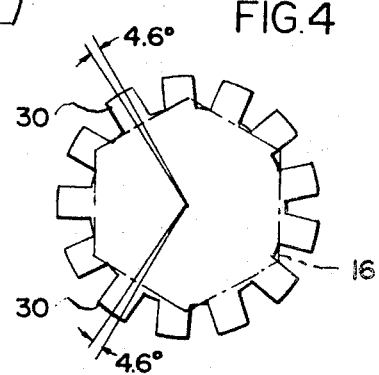
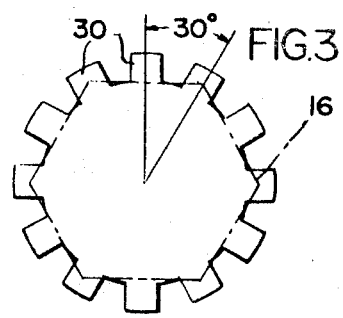
INVENTOR
CHARLES E. HEIN
BY *Evan D. Roberts*
ATTORNEY

United States Patent Office 3,447,342
Patented June 3, 1969

---

3,447,342
TORQUE LIMITER DEVICE
Charles E. Hein, Newfield, N.Y., assignor, by mesne assignments, to Borg-Warner Corporation, Chicago, Ill., a corporation of Delaware
Filed Oct. 30, 1967, Ser. No. 678,782
Int. Cl. F16d 7/02; F16b 39/00
U.S. Cl. 64—30     7 Claims

ABSTRACT OF THE DISCLOSURE

A disc spring biased torque limiter is disclosed hereinto provide a structure whereby a drive element such as a sprocket is frictionally engaged by pressure plates under a resilient force of a magnitude determined by a nut tightened on the hub of the torque limiter.

Summary of the invention

This invention relates to an improved torque limiter wherein a sprocket or other drive member is positioned on a hub between a hub pressure plate and an adjustable pressure plate, and is in frictional engagement with the pressure plates. In particular, this invention relates to that type of torque limiter which has a torque limiting axial pressure exerted between the pressure plates as a result of a nut threaded a predetermined distance on the hub against the resistance of a resilient spring means between the nut and an adjustable pressure plate, wherein a pilot nut retaining washer provides a large number of locked adjustment positions.

Although the torque limiter spring must have clearance with respect to the torque limiter hub or other member on which it is mounted to allow it to deflect under load, it also should be maintained concentrically on the hub so that it will provide a uniform axial torque limiting force. Further, inasmuch as the position of the nut on the hub has a critical effect in determining the torque limitation on the torque limiter, and inasmuch as the nut has the tendency to loosen as a result of loading forces exerted thereon by the element retained by the torque limiter, it would be advantageous to be able to provide a means for retaining the nut in as many radial positions as possible on the hub to lock the nut in the exact torque limiting setting desired.

Other advantages and novel aspects of the invention will become apparent upon the following detailed description in conjunction with the accompanying drawing wherein:

FIG. 1 is a partially sectioned radial view of the assembled torque limiter with the disc spring and adjusting nut respectively positioned and retained by the pilot nut retaining washer and pilot nut;

FIG. 2 is an axial view of the pilot nut retaining washer showing the complemental hub flats and bendable nut locking tabs thereof;

FIG. 3 is a reduced axial view of an improved pilot nut retaining washer of this invention having an even number of tabs and showing the pilot nut in phantom line position with respect to the washer; and FIG. 4 is a reduced axial view of an improved pilot nut retaining washer of this invention having an odd number of tabs and showing the pilot nut in phantom line position with respect to the washer.

A torque limiter generally designated by the numeral 10 is shown in FIG. 1 for the purpose of illustrating and describing this invention. The torque limiter 10 includes, among other things, a hub 11, a hub pressure plate flange 12, an adjustable pressure plate 13, a disc spring 14, a pilot nut retaining washer 15 and a nut 16.

The hub pressure plate flange 12 is an integral part of the hub 11. The adjustable pressure plate 13 is provided with an aperture 17 having flat chordal surfaces (not shown), and is slidably mounted on hub 11 with the flat surfaces thereof in complemental engagement with corresponding flat surfaces 19 on the hub 11. The pressure plate 13 is thereby positioned on the hub 11 for axial movement therealong and is held against rotation with respect thereto. The pressure plates 12 and 13 are provided with friction surfaces 20 which are adapted to frictionally engage a drive member 21 when said pressure plate 13 is urged toward the pressure plate 12 on the hub 11.

The disc spring 14 is provided with a circular aperture 25 which is substantially larger than the diameter of the hub 11. The spring 14 is positioned for engagement with the adjustable pressure plate 13 with the hub 11 through the aperture 25 thereof. The pilot nut retaining washer 15 has an aperture 26 therethrough with flat chordal surfaces 27 which concentrically and complementally position the washer 14 on the hub 11. A circular pilot embossment 28 is provided on the washer 15 and is adapted to concentrically support the disc spring 14 on the hub 11 when positioned in the aperture 25 of the disc spring. The washer 15 is made of nonresilient material which will tend to retain its shape when deformed, and is provided with an outer peripheral portion 29 which is shown as a series of radially extending and circumferentially spaced tabs 30. The outer portion 29 of the washer 15 can be a circumferentially solid periphery but must extend beyond the minimum radial dimension of the nut 16 which is threaded on the shaft 11 in engagement with the washer 15.

The improved torque limiter device 10 of this invention is placed in operation by positioning the drive member 21 on the hub 11 adjacent the friction surface 20 of the flange pressure plate 12; placing the sliding adjustable pressure plate 13 on the hub 11 with the friction surface 20 thereof adjacent the drive member 21, positioning the disc spring 14 over the hub 11 and adjacent the adjustable pressure plate 13; sliding pilot nut retaining washer 15 over the hub 11 with the pilot embossment 28 in the aperture 25 of the disc spring 14 to engage and concentrically position the spring 14 on the hub 11; threadably positioning the nut 16 on the hub against the resilience of the disc spring 14 to provide a predetermined selected force on said adjustable pressure plate 13 to cause the yieldable frictional retention of the drive member 20 between pressure plates 12 and 13; and deforming one or more of the tabs 30 of the outer portion 30 of the washer 15 over a side face 31 of the nut 16 to retain the nut 16.

Although the outer annular portion 29 of the washer 15 of this invention could be a solid portion, deformable against the side 31 of the nut 16, the inventor has found that the locking and positioning facility of the washer 15 with respect to the nut 16 is greatly improved by providing tabs 30 to comprise the peripheral portion 29. Moreover, the inventor has provided a further improved embodiment of the washer 15 by providing a washer which has an odd number of tabs 30 (FIG. 4).

The provision of the tabs 30 provides a general advantage over a solid outer annular portion 29 in that the tabs 30 are more easily bent over the sides 31 of the nut 16, as shown. Also, even though a solid portion 29 would provide a larger area, it is very difficult to bend a portion thereof so that it will fully engage a side 31 of the nut 16. Although providing an even number of tabs 30 on the washer 15 provides a better form of the invention than a solid periphery 29, a particular added advantage is provided when the best form of the invention (FIG. 4) is utilized, namely, the provision of a washer 15 having an odd number of peripheral tabs 30.

When the tabs 30 are provided in an even number such as twelve as shown (FIG. 3), the nut 16 can be positioned for stable adjustment with six sides 31 thereof perpendicularly adjacent every other tab for any one torque adjustment of the nut 16. However, in this improved embodiment, the nut 16 must be rotated 30° before the alternate tabs will be perpendicularly adjacent the sides 31 of the nut 16; and therefore, all certain adjustments must be made in a minimum of 30° increments.

However, in an improved embodiment of the invention, the tabs 30 are provided in a number which is at least one different than a multiple of the number of faces 31 on the nut 16. For example, this would include a number of tabs 30 on the order of seven through eleven and thirteen through seventeen when the nut 16 has six sides as shown (FIG. 4). When the nut 16 is thus provided with thirteen sides as compared to twelve as described above, the nut 16 can thereby be positioned for stable adjustment with a side 31 thereof perpendicularly adjacent one tab 30 for any one torque adjustment of the nut 16. In this further improved embodiment, the nut 16 need only be moved approximately 4.6° before the alternate tab 30 will be perpendicularly adjacent a side 31 of the nut 16; and therefore, all certain adjustments of this improved embodiment may be made in increments of approximately 4.6° which provides a much finer adjustment than that which is provided in the embodiment having an even number of tabs as described above.

Thus the improved torque limiter 10 of this invention is provided with a single structure 15 which both concentrically positions the disc spring 14 on the hub 11 and provides a means for locking the nut 16 to the hub 11 in any selected position thereon to maintain a concentric and axially uniform force between the pressure plates 12 and 13 and thereby maintain substantially constant torque limiting characteristics in the torque limiter 10 with respect to the drive member 20.

It is to be understood that the invention is not to be limited to the specific constructions and arrangements shown and described, as it will be understood to those skilled in the art that changes may be made without departing from the principles of the invention.

What is claimed is:

1. An improved torque limiting device comprising a hub, an axial hub pressure plate secured to said hub, an adjustable pressure plate keyed to said hub to rotate therewith and adapted to move axially on said hub toward said hub pressure plate, a disc spring positioned on said hub adjacent to said adjustable pressure plate and having a hub receiving opening substantially larger than said hub, a nut having uniformly circumferentially spaced flat chordal peripheral surfaces and threaded on said hub for exerting an axial force through said disc spring and an adjustable pressure plate to cause said pressure plates to frictionally engage a drive member therebetween, and a pilot nut retaining washer axially slidably keyed to said hub between said nut and said disc spring, said pilot washer having a pilot embossment formed on one side thereof adapted to enter the aperture in said disc spring to radially position said disc spring on said hub, said pilot washer having portions thereof extending radially beyond the minimum radial width of said adjusting nut and adapted to retain a deformed position in that portion radially beyond said nut and with respect to said nut to lock said nut against rotation with respect to said pilot washer and said hub.

2. An improved torque limiting device as defined in claim 1 wherein said pilot washer portions extending radially beyond said nut are circumferentially spaced tabs.

3. An improved torque limiting device as defined in claim 2 wherein said tabs are provided in a number equal to a multiple of the number of flat surfaces on said nut.

4. An improved torque limiting device as defined in claim 2 wherein said tabs are provided in a number equal to a number which is different than a multiple of the number of said flat surfaces on said nut.

5. An improved torque limiting device as defined in claim 2 wherein said tabs are provided in a number which is one different than a multiple of the number of said flat surfaces on said nut.

6. An improved torque limiting device as defined in claim 2 wherein said nut flat surfaces are six in number and said tabs are eleven in number.

7. An improved torque limiting device as defined in claim 2 wherein said nut flat surfaces are six in number and said tabs are thirteen in number.

References Cited

UNITED STATES PATENTS

| | | | |
|---|---|---|---|
| 2,753,703 | 7/1956 | McIntyre | 64—30 |
| 2,857,750 | 10/1958 | Fox | 64—30 |
| 3,092,983 | 6/1963 | Huber | 64—30 |
| 3,157,978 | 11/1964 | McMullen | 64—30 X |
| 3,294,141 | 12/1966 | Schotthoefer et al. | 151—46 X |

HALL C. COE, *Primary Examiner.*

U.S. Cl. X.R.

151—46